United States Patent
Onoue et al.

(10) Patent No.: US 12,033,802 B2
(45) Date of Patent: Jul. 9, 2024

(54) MULTILAYER CAPACITOR HAVING SINTERED ELECTRODE LAYER WITH WRAPAROUND PORTION

(71) Applicant: TDK CORPORATION, Tokyo (JP)

(72) Inventors: Toru Onoue, Tokyo (JP); Daisuke Himeta, Tokyo (JP); Yusuke Karasawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 79 days.

(21) Appl. No.: 17/569,815

(22) Filed: Jan. 6, 2022

(65) Prior Publication Data

US 2022/0238279 A1    Jul. 28, 2022

(30) Foreign Application Priority Data

Jan. 27, 2021   (JP) .................. 2021-010995

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC ............. *H01G 4/30* (2013.01); *H01G 4/012* (2013.01); *H01G 4/12* (2013.01); *H01G 4/232* (2013.01)

(58) Field of Classification Search
CPC ........... H01G 4/30; H01G 4/012; H01G 4/12; H01G 4/232; H01G 4/1227; H01G 4/005; H01G 4/35
See application file for complete search history.

(56) References Cited

U.S. PATENT DOCUMENTS

| | | | | |
|---|---|---|---|---|
| 2012/0327557 A1* | 12/2012 | Ahn | ................. | H01G 4/228 |
| | | | | 361/321.3 |
| 2013/0250472 A1* | 9/2013 | Lee | ................. | H01G 4/012 |
| | | | | 361/301.4 |
| 2016/0020028 A1 | 1/2016 | Katsuta | | |
| 2016/0240315 A1* | 8/2016 | Onoue | ................. | H01G 4/2325 |
| 2018/0025844 A1* | 1/2018 | Sato | ................. | H01G 4/008 |
| | | | | 361/321.2 |
| 2018/0082792 A1* | 3/2018 | Satoh | ................. | H01G 4/232 |
| 2018/0082793 A1* | 3/2018 | Satoh | ................. | H01G 4/2325 |

(Continued)

FOREIGN PATENT DOCUMENTS

| | | |
|---|---|---|
| CN | 104576051 A | 4/2015 |
| CN | 108695071 A | 10/2018 |

(Continued)

*Primary Examiner* — David M Sinclair
*Assistant Examiner* — Daniel M Dubuisson
(74) *Attorney, Agent, or Firm* — Oliff PLC (57) ABSTRACT

In the sintered electrode layer covering the one end face, a wraparound dimension of a wraparound portion wrapping around from the one end face to the one main face in the facing direction is set to a dimension b, a distance between the one end face and the end portions of the plurality of second internal electrodes on the one end face side in the facing direction is set to a dimension Lg, a distance between the pair of main faces in the stacking direction is set to a dimension T, and a distance between the one main face and the second internal electrode closest to the one main face is set to a dimension Tg1, a relational expression of $Lg > b - (2 \times b \times Tg1/T)$ is satisfied.

8 Claims, 10 Drawing Sheets

(56) References Cited

U.S. PATENT DOCUMENTS

| | | | |
|---|---|---|---|
| 2018/0108480 A1 | 4/2018 | Fujii et al. | |
| 2018/0286583 A1 | 10/2018 | Onoue et al. | |
| 2020/0027662 A1* | 1/2020 | Suga | H01G 4/008 |
| 2020/0066451 A1* | 2/2020 | Bang | H01G 4/0085 |
| 2020/0082983 A1* | 3/2020 | Kim | H01G 4/012 |
| 2020/0152383 A1* | 5/2020 | Togou | H01G 4/232 |
| 2020/0152384 A1* | 5/2020 | Sasaki | H01G 4/012 |
| 2020/0152386 A1* | 5/2020 | Togou | H01G 4/224 |
| 2020/0161052 A1* | 5/2020 | Cha | H01G 4/232 |
| 2020/0312560 A1* | 10/2020 | Onishi | H01G 4/232 |

FOREIGN PATENT DOCUMENTS

| | | |
|---|---|---|
| JP | 2003-022929 A | 1/2003 |
| JP | 2016-127262 A | 7/2016 |
| JP | 2018-067562 A | 4/2018 |

\* cited by examiner

| CHIP SIZE | T[μm] | b[μm] | Tg1[μm] | b-(2×b×Tg1/T)[μm] | Lg[μm] | PRESENCE OF SHORT-CIRCUIT |
|---|---|---|---|---|---|---|
| C0402 | 180 | 90 | 25 | 65 | 60 | PRESENCE |
| C0603 | 280 | 140 | 30 | 110 | 70 | PRESENCE |
| C1005 | 480 | 250 | 50 | 198 | 70 | PRESENCE |
| C1608 | 760 | 350 | 80 | 276 | 100 | PRESENCE |
| C2012 | 1200 | 500 | 100 | 417 | 100 | PRESENCE |
| C3216 | 1500 | 550 | 120 | 462 | 120 | PRESENCE |
| C0402 | 180 | 80 | 20 | 62 | 70 | ABSENCE |
| C0603 | 280 | 140 | 40 | 100 | 110 | ABSENCE |
| C1005 | 280 | 160 | 60 | 91 | 100 | ABSENCE |
| C1608 | 550 | 180 | 150 | 82 | 90 | ABSENCE |
| C1608 | 590 | 190 | 145 | 97 | 130 | ABSENCE |
| C1608 | 590 | 185 | 100 | 122 | 140 | ABSENCE |
| C1608 | 590 | 240 | 145 | 122 | 140 | ABSENCE |
| C1608 | 750 | 190 | 100 | 139 | 150 | ABSENCE |
| C1608 | 750 | 185 | 90 | 141 | 150 | ABSENCE |
| C1608 | 850 | 190 | 100 | 145 | 150 | ABSENCE |
| C1608 | 900 | 200 | 100 | 156 | 170 | ABSENCE |
| C1608 | 900 | 230 | 100 | 179 | 190 | ABSENCE |
| C2012 | 950 | 250 | 120 | 187 | 200 | ABSENCE |
| C3216 | 1250 | 320 | 160 | 238 | 250 | ABSENCE |

Fig. 10

| L[μm] | Lg[μm] | RATIO OF CAPACITANCE | Lg(0.14×L)[μm] | RATIO OF CAPACITANCE |
|---|---|---|---|---|
| 380 | 70 | 100 | 53 | 114 |
| 580 | 110 | 100 | 81 | 116 |
| 950 | 100 | 100 | 133 | 91 |
| 1550 | 90 | 100 | 217 | 81 |
| 1550 | 130 | 100 | 217 | 87 |
| 1550 | 140 | 100 | 217 | 88 |
| 1550 | 140 | 100 | 217 | 88 |
| 1550 | 150 | 100 | 217 | 89 |
| 1550 | 150 | 100 | 217 | 89 |
| 1550 | 150 | 100 | 217 | 89 |
| 1550 | 170 | 100 | 217 | 92 |
| 1550 | 190 | 100 | 217 | 95 |
| 1900 | 200 | 100 | 266 | 91 |
| 3100 | 250 | 100 | 434 | 86 |

MULTILAYER CAPACITOR HAVING SINTERED ELECTRODE LAYER WITH WRAPAROUND PORTION

CROSS REFERENCE TO RELATED APPLICATIONS

This application claims priority to Japanese Patent Application No. 2021-010995 filed on Jan. 27, 2021, the entire contents of which are incorporated by reference herein.

TECHNICAL FIELD

The present disclosure relates to multilayer capacitors.

BACKGROUND

In the related art, as a multilayer capacitor, a multilayer ceramic capacitor disclosed in Japanese Unexamined Patent Publication No. 2018-67562 is known. This multilayer ceramic capacitor includes a stacked body having a plurality of dielectric layers and a plurality of internal electrodes that are stacked on top of one another, a first end face external electrode disposed on a first side face of the stacked body, and a second end face external electrode disposed on a second side face of the stacked body. That is, this multilayer ceramic capacitor is a so-called three-terminal-type multilayer ceramic capacitor.

SUMMARY

When the above-mentioned three-terminal-type multilayer ceramic capacitor is mounted on an electronic device, for example, the first end face external electrode and the second end face external electrode are soldered to the electronic device. Accordingly, a peripheral structure of each external electrode bends due to thermal expansion or the like, so that cracks may occur in an element body constituting the stacked body. Such cracks can cause a short-circuit between the internal electrodes.

The present disclosure has been made to solve the above problems, and an object of the present disclosure is to provide a multilayer capacitor capable of suppressing a short-circuit.

A multilayer capacitor according to the present disclosure includes: an element body having a pair of end faces facing each other and a pair of side faces and a pair of main faces located between the pair of end faces and extending in a facing direction of the pair of end faces; a pair of first external electrodes disposed on the pair of end faces; a second external electrode separated from the pair of first external electrodes and disposed on at least one of the pair of side faces; a plurality of first internal electrodes disposed in the element body and exposed from at least one of the end faces; and a plurality of second internal electrodes disposed in the element body and separated from one of the end faces, wherein the pair of first external electrodes covers the pair of end faces and includes a sintered electrode layer connected to the plurality of first internal electrodes, wherein each of the plurality of first internal electrodes and each of the plurality of second internal electrodes are stacked with each other with a direction of the pair of main faces facing each other as a stacking direction, and wherein, when, in the sintered electrode layer covering the one end face, a wraparound dimension of a wraparound portion wrapping around from the one end face to the one main face in the facing direction is set to a dimension b, a distance between the one end face and the end portions of the plurality of second internal electrodes on the one end face side in the facing direction is set to a dimension Lg, a distance between the pair of main faces in the stacking direction is set to a dimension T, and a distance between the one main face and the second internal electrode closest to the one main face is set to a dimension Tg1, a relational expression of $Lg > b - (2 \times b \times Tg1/T)$ is satisfied.

The multilayer capacitor according to the present disclosure includes a first external electrode disposed on a pair of end faces facing each other, and a second external electrode disposed on at least one of a pair of side faces extending in the facing direction of the pair of end faces. This multilayer capacitor can be mounted on the electronic device by bonding each external electrode to the electronic device. Therefore, the multilayer capacitor is mounted on the electronic device with any main face being set to a mounting face. Herein, as a result of diligent research, the present inventors have found that there is a high correlation between the position of cracks occurring in the element body due to thermal expansion and the like and the dimensions of each configuration of the multilayer capacitor. More specifically, as viewed from the direction in which the pair of side faces face each other, in the sintered electrode layers covering one end face, a virtual line segment connecting the end portion in the facing direction of the wraparound portion wrapping around from one end face to one main face and the midpoint of one end face in the stacking direction is set. The present inventors have found that cracks are likely to occur in a region (referred to as a crack occurring region) between the virtual line segment and a corner of the sintered electrode layer. On the other hand, the multilayer capacitor according to the present disclosure satisfies the relational expression of $Lg > b - (2 \times b \times Tg1/T)$. In this case, on one end face side, the end portion of the second internal electrode having a polarity different from that of the first external electrode is located outside the crack occurring region even if the end portion of the second internal electrode is closest to the mounting face. For this reason, it is possible to prevent cracks from reaching any second internal electrode having a polarity different from that of the first external electrode. Accordingly, even when cracks occur in the element body, it is possible to suppress the occurrence of the cracks in the region where the plurality of first internal electrodes and the plurality of second internal electrodes are stacked. From the above, a short-circuit can be suppressed.

When a distance between the one main face and the first internal electrode closest to the one main face is set to a dimension Tg2, a relational expression of $Tg1 > Tg2$ and $Lg > b - (2 \times b \times Tg2/T)$ may be satisfied. In this case, the first internal electrode is closer to one main face than the second internal electrode. At this time, in the plurality of first internal electrodes, the portion corresponding to the end portion of the plurality of second internal electrodes on one end face side is located outside the crack occurring region. Accordingly, even when cracks occur in the element body, it is possible to more reliably suppress the occurrence of the cracks in the region where the plurality of first internal electrodes and the plurality of second internal electrodes are stacked. From the above, the short-circuit can be suppressed.

The dimension Lg may be smaller than the dimension b. In this case, it is possible to secure the area of the region where the plurality of first internal electrodes and the plurality of second internal electrodes are stacked. Therefore, the capacitance can be secured.

When a length of the element body in the facing direction is set to a dimension L, a relational expression of $Lg < 0.14 \times L$ may be satisfied. In this case, it is possible to secure the area of the region where the plurality of first internal electrodes and the plurality of second internal electrodes are stacked. Therefore, the capacitance can be secured.

The dimension Tg1 may be 90 µm to 150 µm. In this case, it is possible to secure a stacking height of the plurality of first internal electrodes and the plurality of second internal electrodes. Therefore, the capacitance can be secured.

The dimension b may be 180 µm to 240 µm. In this case, the region where cracks occur in the element body can be maintained small. Therefore, the short-circuit can be suppressed.

A length in a longer direction may be 1.6 mm or more, and a length in a shorter direction may be 0.8 mm or more. In this case, the size of the multilayer capacitor in the longer direction and the shorter direction can be secured. Therefore, the capacitance can be secured. In addition, in the multilayer capacitor having such a large chip size, the effect of suppressing the short-circuit can be obtained more remarkably.

According to the present disclosure, it is possible to provide a multilayer capacitor capable of suppressing short-circuit.

DETAILED DESCRIPTION

Hereinafter, preferred embodiments of a multilayer capacitor according to one aspect of the present disclosure will be described in detail with reference to the drawings.

Figure 1:
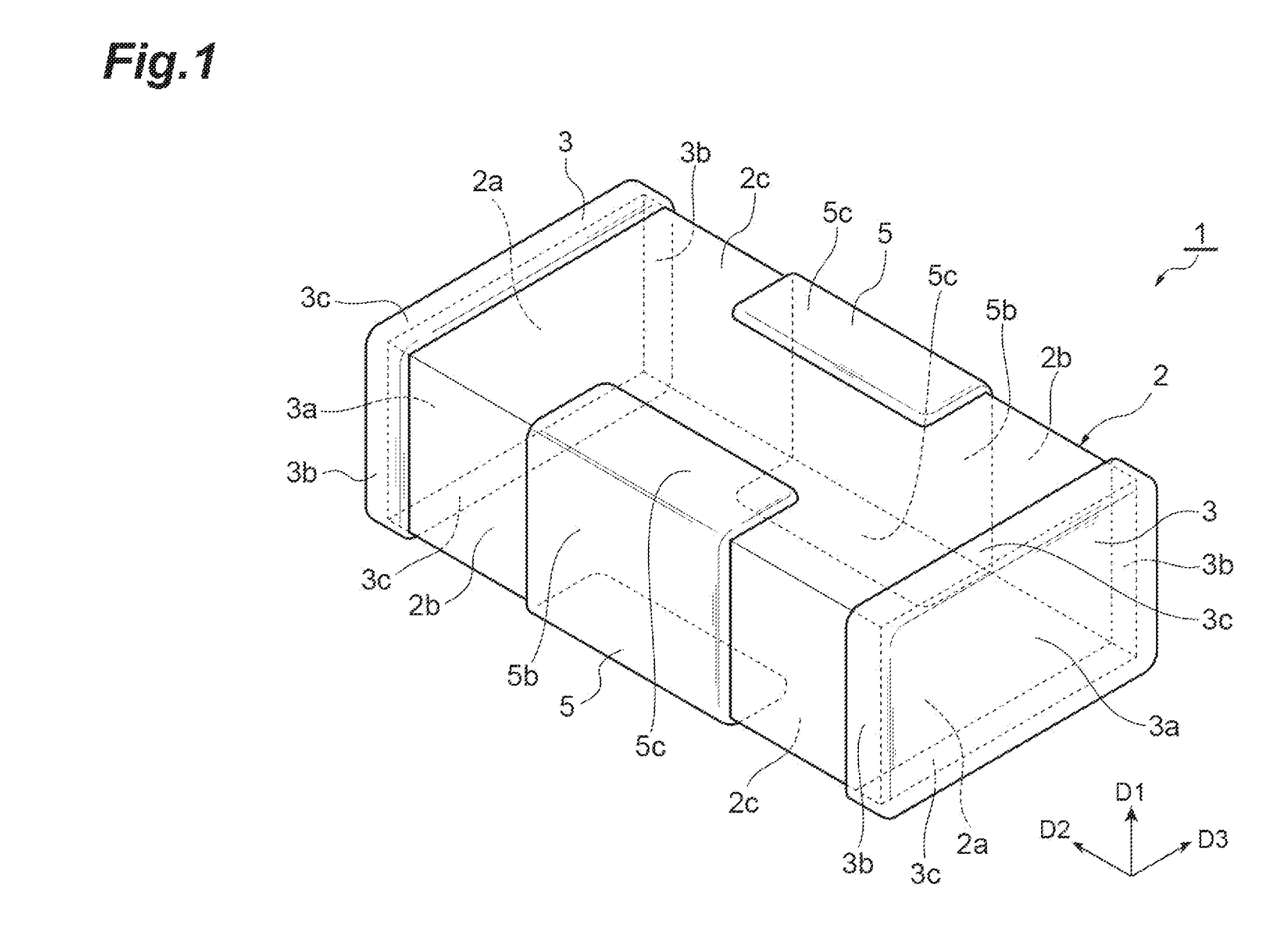
FIG. 1 is a schematic perspective view illustrating a penetrating capacitor according to an embodiment of the present disclosure.

The multilayer capacitor according to the present disclosure will be described with reference to FIG. 1. FIG. 1 is a schematic perspective view illustrating a penetrating capacitor 1 according to an embodiment of the present disclosure. In the present embodiment, the penetrating capacitor 1 will be illustrated as a multilayer capacitor.

The penetrating capacitor 1 is a so-called three-terminal-type multilayer capacitor. The penetrating capacitor 1 can be mounted on the electronic device such as a circuit board as an example. In the present embodiment, the penetrating capacitor 1 has, for example, a 1608 size (1.6 mm×0.8 mm×0.8 mm). The chip size of the penetrating capacitor 1 is not particularly limited, but the chip size may be 1608 size or more, that is, the length in the longer direction may be 1.6 mm or more, the length in the shorter direction may be 0.8 mm or more, and the thickness may be 0.8 mm or more. As illustrated in FIG. 1, the penetrating capacitor 1 includes an element body 2, a pair of first external electrodes 3 and 3, and a pair of second external electrodes 5.

The element body 2 is formed by stacking a dielectric layer in the height direction of the penetrating capacitor 1. Each dielectric layer is configured with a sintered body of a ceramic green sheet containing, for example, a dielectric material (dielectric ceramic such as $BaTiO_3$ system, $Ba(Ti, Zr)O_3$ system, or $(Ba, Ca)TiO_3$ system). In an actual element body 2, each dielectric layer is integrated to such an extent that the boundary between the respective dielectric layers cannot be visually recognized. As illustrated in FIG. 1, a shape of the element body 2 is a substantially rectangular parallelepiped shape. The rectangular parallelepiped shape includes a rectangular parallelepiped shape in which corners and ridges are chamfered. In addition, the rectangular parallelepiped shape includes a rectangular parallelepiped shape in which corners and ridges are rounded.

The element body 2 has a pair of end faces 2a and 2a facing each other. Hereinafter, the direction in which the pair of end faces 2a and 2a face each other is referred to as a facing direction D2. The element body 2 has a pair of side faces 2b and 2b and a pair of main faces 2c and 2c located between the pair of end faces 2a and 2a and extending in the facing direction D2 of the pair of end faces 2a and 2a. Hereinafter, the direction in which the pair of main faces 2c and 2c face each other is referred to as a stacking direction D1, and the direction in which the pair of side faces 2b and 2b face each other is referred to as a width direction D3. In the present embodiment, the stacking direction D1 coincides with a height direction of the penetrating capacitor 1. The lengths of the element body 2 in the facing direction D2 and the width direction D3 are larger than the length in the stacking direction D1. In addition, the length of the element body 2 in the facing direction D2 is larger than the length in the width direction D3. The length of the element body 2 in the facing direction D2 may be 900 µm to 3400 µm. The length of the element body 2 in the width direction D3 may be 460 µm to 1860 µm. The length of the element body 2 in the stacking direction D1 (dimension T described later) may be 280 µm to 1250 µm, preferably 550 µm to 900 µm.

Each of the pair of first external electrodes 3 and 3 is disposed on the pair of end faces 2a. The pair of first external electrodes 3 and 3 are separated from each other and face each other in the facing direction D2. The first external electrode 3 has a main body portion 3a disposed on the end face 2a, a pair of wraparound portions 3b disposed on the side face 2b, and a pair of wraparound portions 3c disposed on the main face 2c. The wraparound portion 3b extends from both ends of the main body portion 3a in the width direction D3 in the facing direction D2. The wraparound portion 3c extends from both ends of the main body portion 3a in the stacking direction D1 in the facing direction D2. The main body portion 3a and the wraparound portions 3b, 3c are connected to each other.

The main body portion 3a of the first external electrode 3 covers the entire corresponding end face 2a. In the present embodiment, the wraparound portions 3b and 3c cover a portion having a length of 0.19 mm from each end face 2a in the facing direction D2.

Each of the pair of second external electrodes 5 and 5 is separated from the pair of first external electrodes 3 and 3 and disposed on the pair of side faces 2b. In the present embodiment, the second external electrode 5 is disposed at the central portion of the element body 2 in the facing direction D2. The pair of second external electrodes 5 are separated from each other and face each other in the width direction D3. The second external electrode 5 has a main body portion 5b disposed on the side face 2b and a pair of wraparound portions 5c disposed on the main face 2c. The wraparound portion 5c extends in the width direction D3 from both ends of the main body portion 5b in the stacking direction D1. The main body portion 5b and the wraparound portion 5c are connected to each other.

The main body portion 5b of the second external electrode 5 has a width of a predetermined length in the facing direction D2 at the central portion of the side face 2b in the facing direction D2. In addition, the main body portion 5b covers the side face 2b in the entire stacking direction D1. The surface area of the main body portion 5b of the second external electrode 5 is smaller than the surface area of the main body portion 3a of the first external electrode 3. In the present embodiment, the length of the main body portion 5b in the facing direction D2 is 0.48 mm. The length of the wraparound portion 5c in the width direction D3 is 0.25 mm.

Subsequently, the configuration of the penetrating capacitor 1 in the element body 2 will be described with reference to FIGS. 2 to 5.

Figure 2:
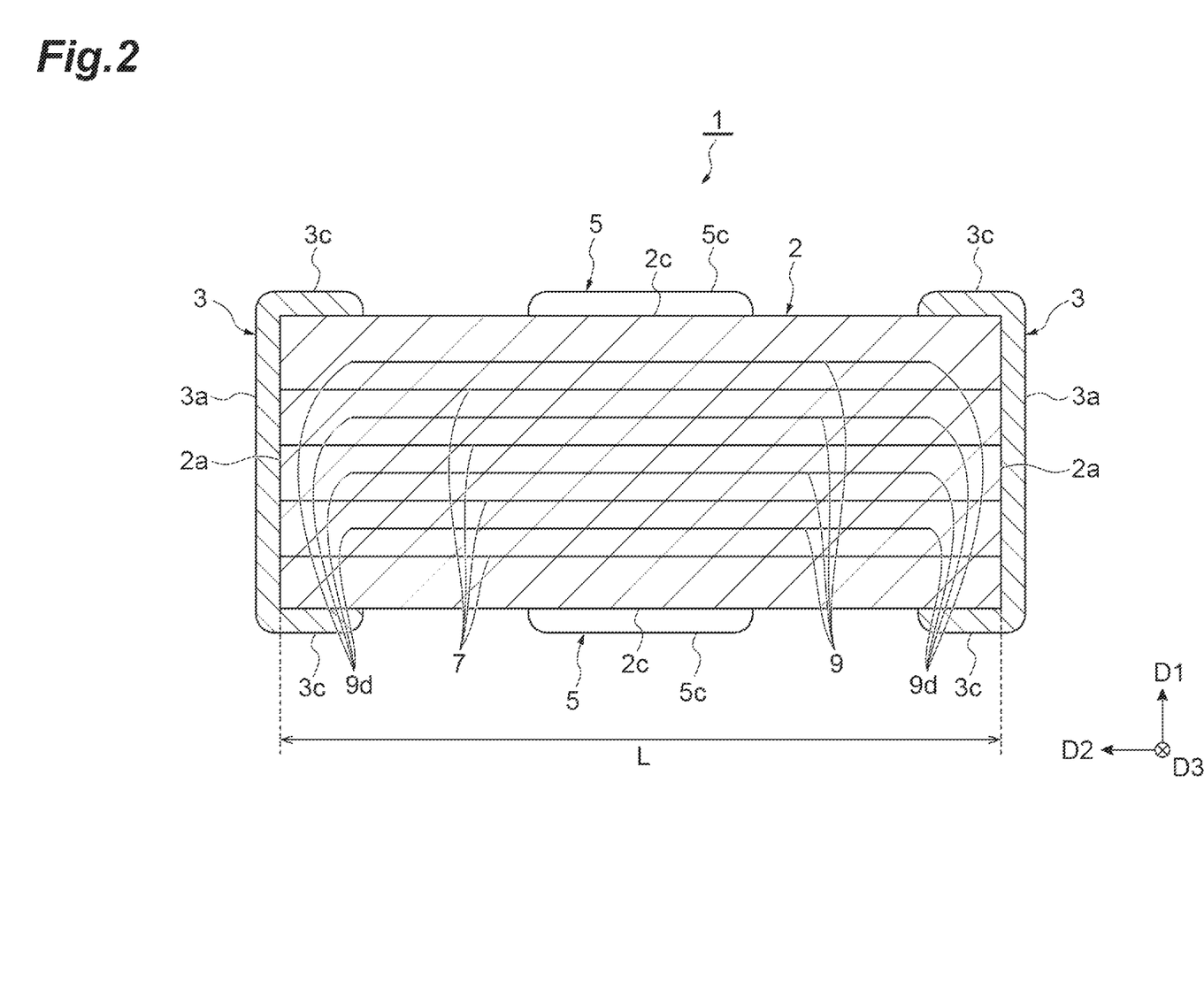
FIG. 2 is a schematic cross-sectional view illustrating the penetrating capacitor according to the embodiment of the present disclosure.
Figure 3:
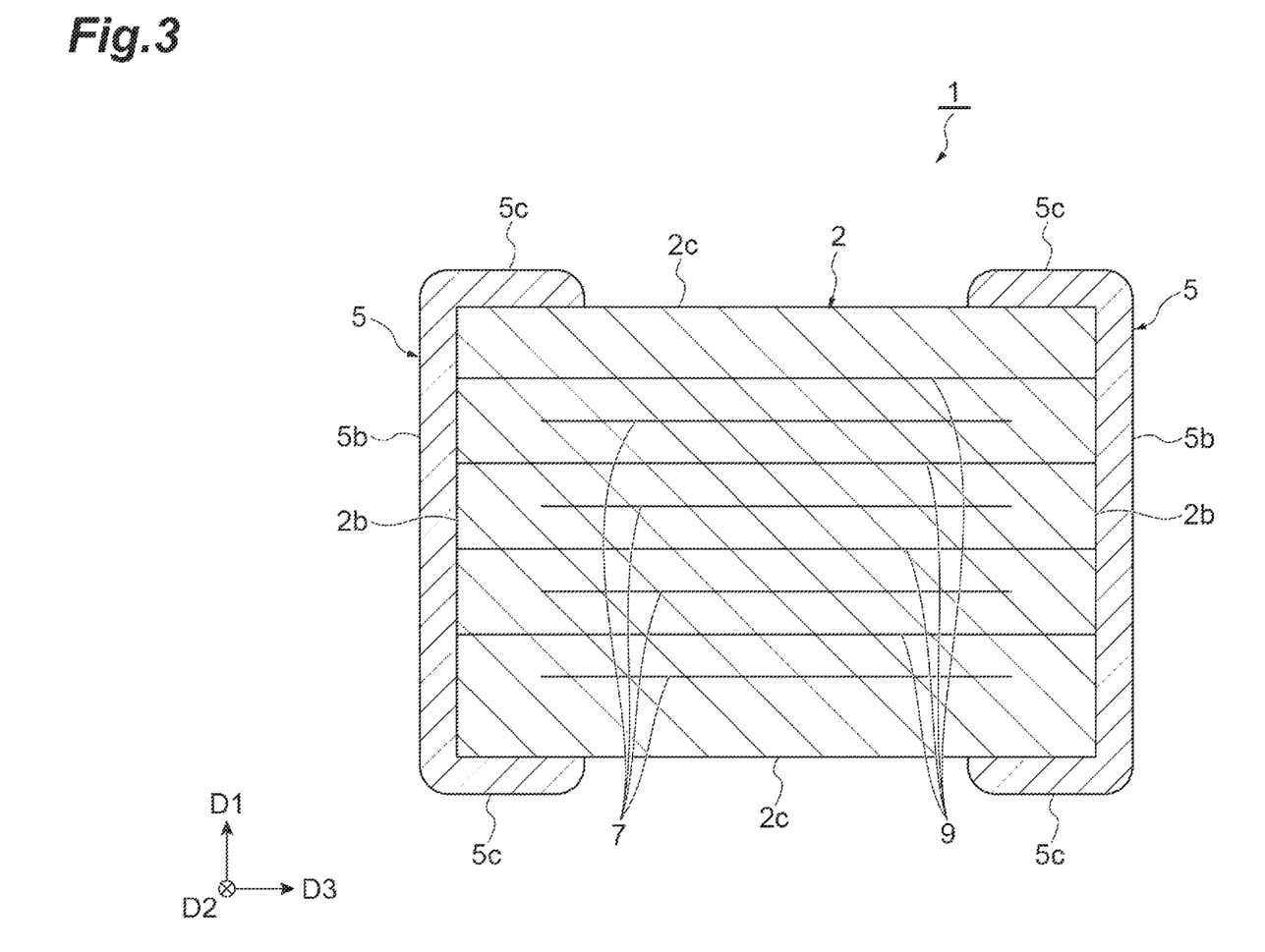
FIG. 3 is a schematic cross-sectional view illustrating the penetrating capacitor according to the embodiment of the present disclosure.

FIGS. 2 to 5 are schematic cross-sectional views illustrating the penetrating capacitor 1 according to the embodiment of the present disclosure. FIG. 2 illustrates a cross section of the penetrating capacitor 1 on a face parallel to the pair of side faces 2b and 2b. FIG. 3 illustrates a cross section of the penetrating capacitor 1 on a face parallel to the pair of end faces 2a and 2a.

As illustrated in FIGS. 2 and 3, a plurality of first internal electrodes 7 and a plurality of second internal electrodes 9 are disposed in the element body 2. The first internal electrode 7 and the second internal electrode 9 are made of a conductive material (for example, Ni or Cu) usually used as an internal electrode of the stacked electric element. The first internal electrode 7 and the second internal electrode 9 are configured as a sintered body of a conductive paste containing the above-mentioned conductive material. Each of the plurality of first internal electrodes 7 and the plurality of second internal electrodes 9 is separated from each other in the stacking direction D1 and is alternately stacked via the dielectric layer of the element body 2.

Figure 4:
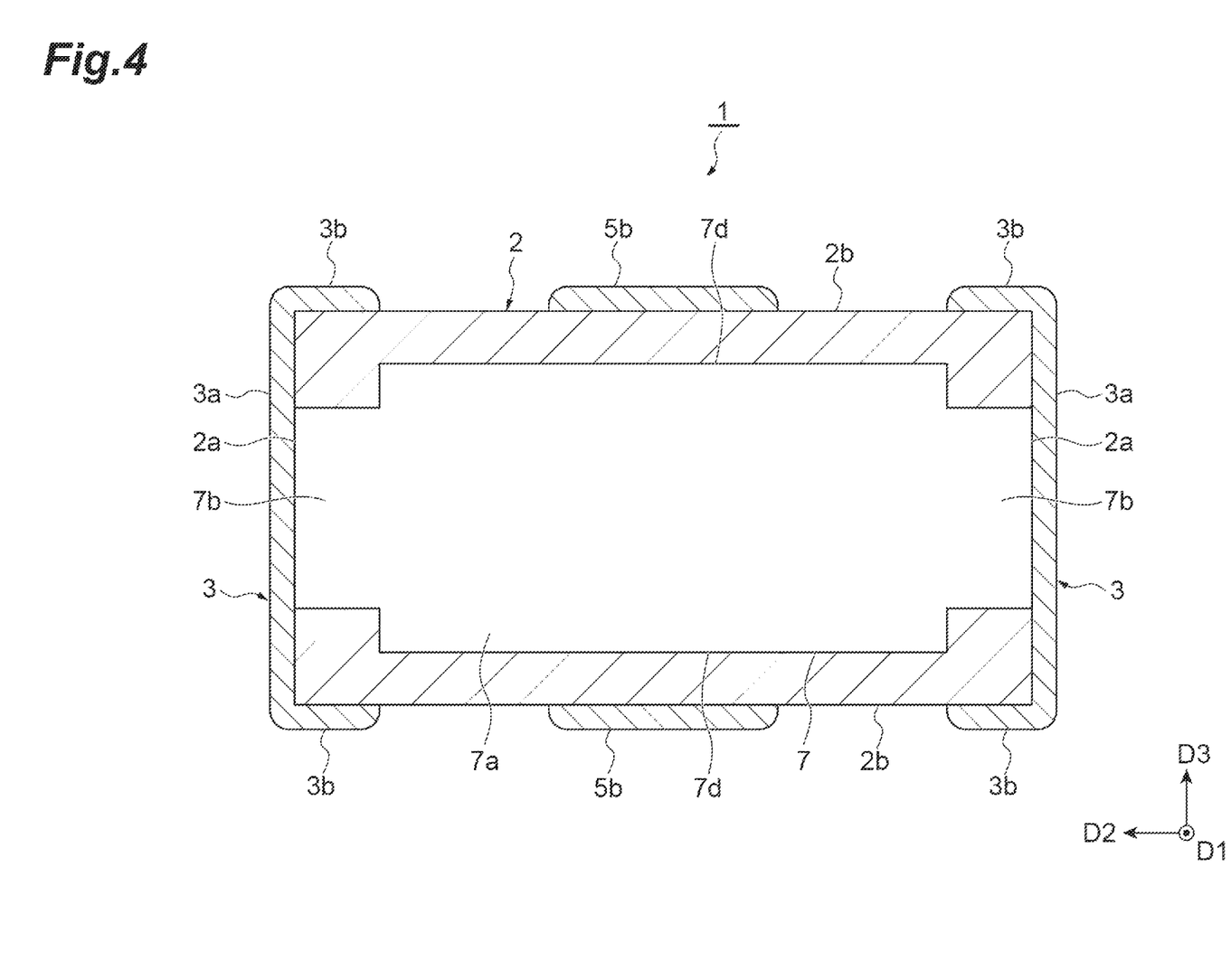
FIG. 4 is a schematic cross-sectional view illustrating the penetrating capacitor according to the embodiment of the present disclosure.

FIG. 4 illustrates a cross section of the penetrating capacitor 1 on a face parallel to the pair of main faces 2c and 2c. FIG. 4 illustrates a cross-sectional view in which one of the plurality of first internal electrodes 7 is exposed. The first internal electrode 7 has a main electrode portion 7a having a substantially rectangular shape and a connection portion 7b. The main electrode portion 7a has a long side along the facing direction D2 and a short side along the width direction D3. As an example, the long-side length of the main electrode portion 7a is 1.29 mm, and the short side length is 0.7 mm. In addition, the connection portion 7b extends from the short-side side of the main electrode portion 7a toward the facing direction D2. The main electrode portion 7a and the connection portion 7b are integrally formed. The length of the connection portion 7b in the width direction D3 is smaller than the length of the main electrode portion 7a in the width direction D3. In the present embodiment, the length of the connection portion 7b in the width direction D3 is 0.35 mm.

Each of the first internal electrodes 7 is exposed from the pair of end faces 2a and 2a and is not exposed from the pair of side faces 2b and 2b and the pair of main faces 2c and 2c (refer to FIG. 2). Each of the first internal electrodes 7 is connected to the first external electrode 3 on the end face 2a. More specifically, the connection portion 7b formed on the short-side side of the main electrode portion 7a is exposed from the pair of end faces 2a and 2a. In addition, the end portion 7d constituting the long-side side of the main electrode portion 7a is separated from the second external electrode 5.

Figure 5:
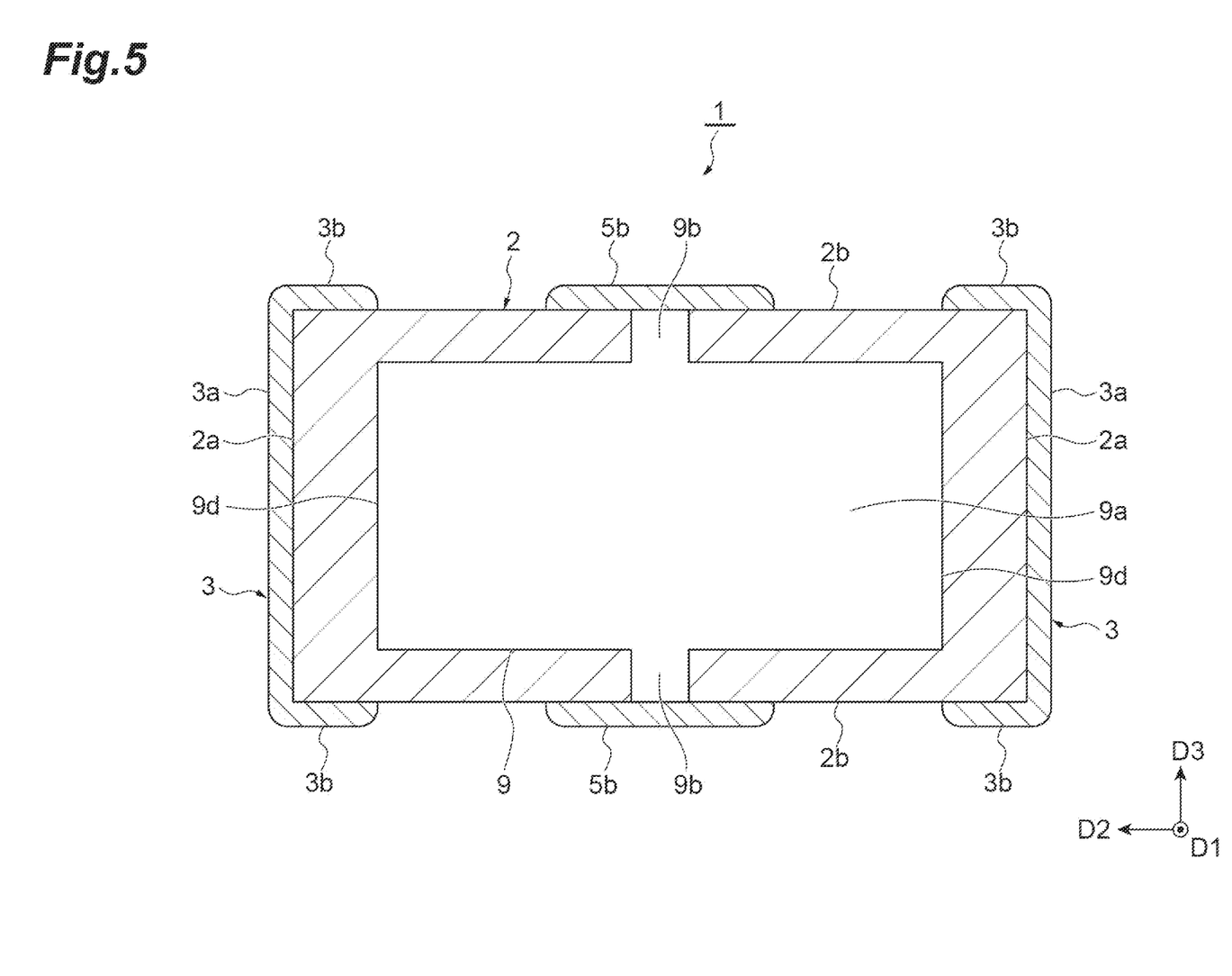
FIG. 5 is a schematic cross-sectional view illustrating the penetrating capacitor according to the embodiment of the present disclosure.

FIG. 5 illustrates a cross section of the penetrating capacitor 1 on a face parallel to the pair of main faces 2c and 2c. FIG. 5 illustrates a cross-sectional view in which one of the plurality of second internal electrodes 9 is exposed. The second internal electrode 9 has a main electrode portion 9a having a substantially rectangular shape and a connection portion 9b. The main electrode portion 9a has a long side along the facing direction D2 and a short side along the width direction D3. As an example, the long-side length of the main electrode portion 9a is 1.29 mm, and the short side length is 0.7 mm. In addition, the connection portion 9b extends from the long-side side of the main electrode portion 9a toward the width direction D3. The main electrode portion 9a and the connection portion 9b are integrally formed. The length of the connection portion 9b in the facing direction D2 is smaller than the length of the main electrode portion 9a in the facing direction D2. In the present embodiment, the length of the connection portion 9b in the facing direction D2 is 0.08 mm.

Each of the second internal electrodes 9 is exposed from the pair of side faces 2b and 2b and is not exposed from the pair of end faces 2a and 2a and the pair of main faces 2c and 2c (refer to FIG. 3). Each of the second internal electrodes 9 is connected to the second external electrode 5 on the side face 2b. More specifically, the connection portion 9b formed on the long-side side of the main electrode portion 9a is exposed from the pair of side faces 2b and 2b. In addition, the end portion 9d constituting the short-side side of the main electrode portion 9a is separated from the first external electrode 3.

Subsequently, the configuration of the first external electrode 3 will be described with reference to FIG. 6.

Figure 6:
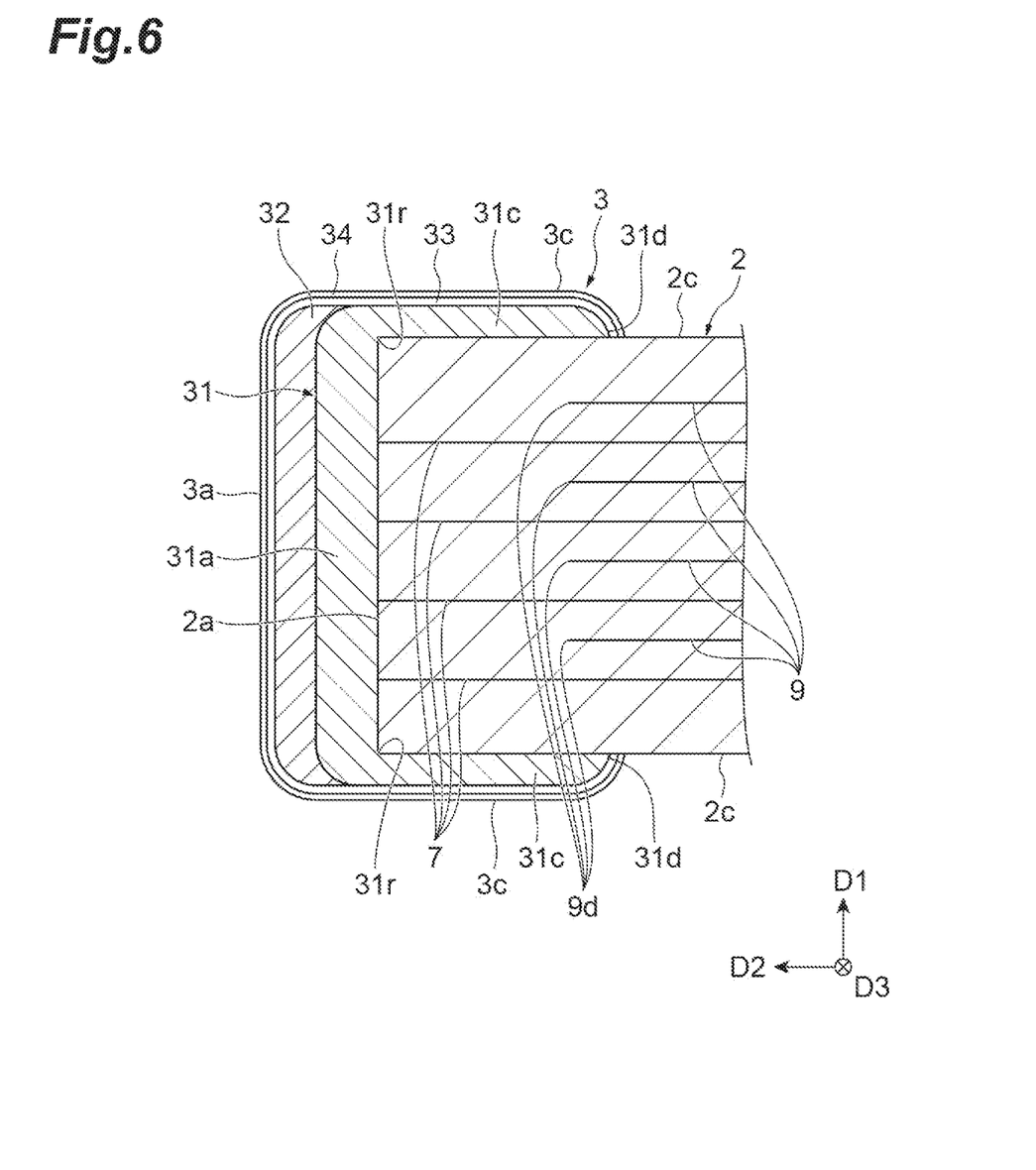
FIG. 6 is an enlarged cross-sectional view of a main portion illustrating a configuration example of a first external electrode.

FIG. 6 is an enlarged cross-sectional view of a main portion illustrating a configuration example of the first external electrode 3. As illustrated in FIG. 6, the first external electrode 3 is configured with a first sintered electrode layer 31, a second sintered electrode layer 32, a first plating layer 33, and a second plating layer 34.

The first sintered electrode layer 31 covers the end face 2a and is connected to a plurality of first internal electrodes 7. The first sintered electrode layer 31 has a main body portion 31a disposed on the end face 2a and a pair of wraparound portions 31c and 31c disposed on the pair of main faces 2c and 2c. In the present embodiment, the main body portion 31a covers the entire end face 2a and is connected to the connection portion 7b (refer to FIG. 4) exposed from the end face 2a. The wraparound portion 31c extends from both ends of the main body portion 31a in the stacking direction D1 toward the facing direction D2. Accordingly, a corner 31r is formed by the main body portion 31a and the wraparound portion 31c. In the present embodiment, ridges are rounded at an end portion 31d of the wraparound portion 31c in the facing direction D2. The second sintered electrode layer 32 is disposed on the first sintered electrode layer 31 and covers the entire end face 2a via the first sintered electrode layer 31.

That is, the second sintered electrode layer 32 covers the main body portion 31a of the first sintered electrode layer 31.

The first plating layer 33 is formed on the first sintered electrode layer 31 and the second sintered electrode layer 32 (hereinafter, may be simply referred to as "sintered electrode layer") by the plating treatment. That is, the entire outer surface of the sintered electrode layer is covered with the first plating layer 33. Herein, as a plating treatment, the above-described plating treatment may be used as an example. The second plating layer 34 is formed on the first plating layer 33 by the plating treatment. That is, the entire outer surface of the first plating layer 33 is covered with the second plating layer 34. The main body portion 3a includes a sintered electrode layer, a first plating layer 33, and a second plating layer 34. The wraparound portion 3c includes a first sintered electrode layer 31, a first plating layer 33, and a second plating layer 34. Although not illustrated in FIG. 6, the configuration of the wraparound portion 3b is the same as that of the wraparound portion 3c.

The sintered electrode layer is formed by baking the conductive paste in a state of being applied to the surface of the element body 2. The sintered electrode layer is formed by sintering a metal component (metal powder) contained in the conductive paste. In the present embodiment, the sintered electrode layer is a sintered metal layer made of Cu. In addition, the sintered electrode layer may be a sintered metal layer made of Ni. As the conductive paste, a powder made of a metal (for example, Cu or Ni) mixed with a glass component, an organic binder, and an organic solvent is used.

In the present embodiment, the first plating layer 33 is an Ni plating layer formed by Ni plating. In addition, the first plating layer 33 may be an Sn plating layer, a Cu plating layer, or an Au plating layer. In the present embodiment, the second plating layer 34 is an Sn plating layer formed by Sn plating. In addition, the second plating layer 34 may be a Cu plating layer or an Au plating layer.

Figure 7:
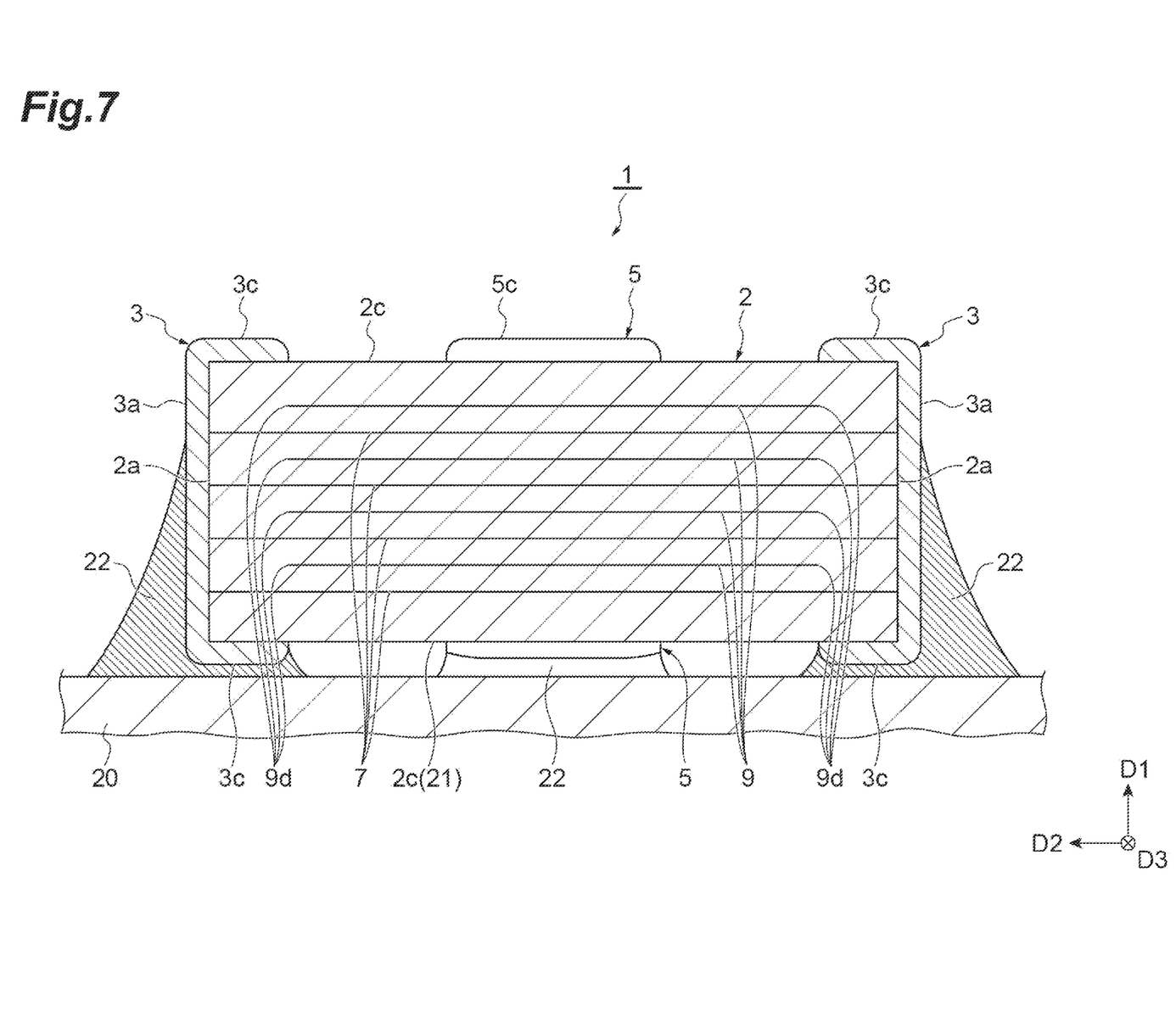
FIG. 7 is a schematic cross-sectional view illustrating a mounting state of the penetrating capacitor.

Subsequently, a mounting state of the penetrating capacitor 1 will be described with reference to FIG. 7.

As described above, the penetrating capacitor 1 is mounted on the electronic device as an example. The electronic device is, for example, a circuit board or other electronic component. FIG. 7 is a schematic cross-sectional view illustrating the mounting state of the penetrating capacitor. As illustrated in FIG. 7, the penetrating capacitor 1 is mounted on the electronic device 20 with any main face 2c of the pair of main faces 2c and 2c being set to a mounting face 21. More specifically, the penetrating capacitor 1 is mounted on the electronic device 20 so that one of the pair of main faces 2c and 2c faces the electronic device 20. In the present embodiment, one main face 2c becomes the mounting face 21 on the electronic device 20.

As an example, the pair of first external electrodes 3 and 3 are soldered to a pad electrode (not illustrated) of the electronic device 20. That is, a solder fillet 22 is formed between the first external electrode 3 and the pad electrode and between the second external electrode 5 and the pad electrode. In the present embodiment, the solder fillet 22 is formed between one wraparound portion 3c that is in contact with the mounting face 21 in the pair of wraparound portions 3c and 3c and the electronic device 20. In addition, the solder fillet 22 is also in contact with the main body portion 3a. In addition, the solder fillet 22 is formed between one wraparound portion 5c that is in contact with the mounting face 21 in the pair of wraparound portion 5c and 5c and the electronic device 20.

Subsequently, the dimensional relationship of each member in the above-mentioned penetrating capacitor 1 will be described with reference to FIG. 8.

Figure 8:
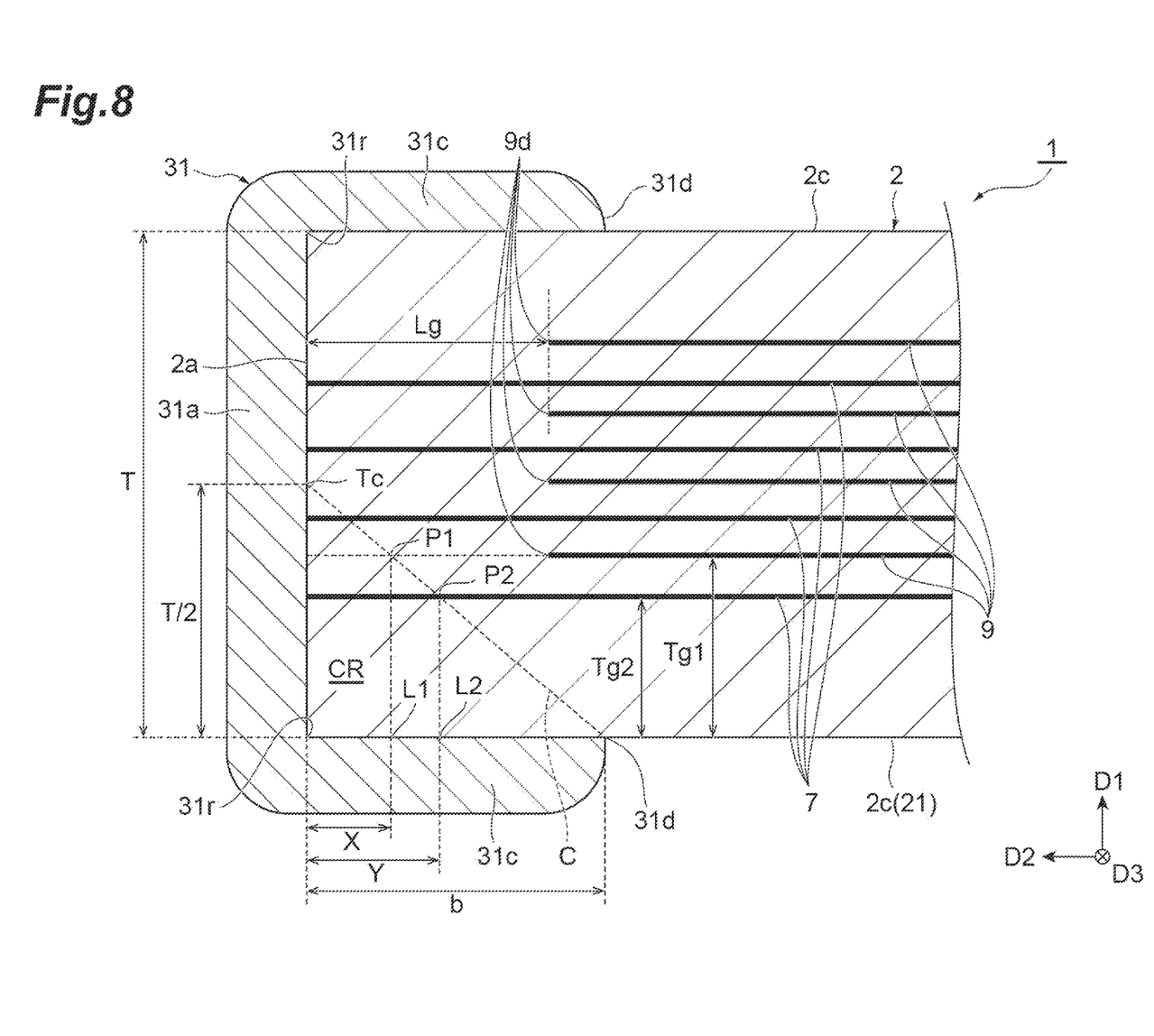
FIG. 8 is a schematic cross-sectional view illustrating a dimensional relationship of each member in the penetrating capacitor.

FIG. 8 is a schematic cross-sectional view illustrating the dimensional relationship of each member in the penetrating capacitor 1. In FIG. 8, among the configuration of the first external electrode 3, only the first sintered electrode layer 31 is illustrated, and other configurations are omitted. As illustrated in FIG. 8, definitions are as follows.

The dimension b is a wraparound dimension of the wraparound portion 31c wrapping around from one end face 2a to the mounting face 21 (one main face 2c) in the facing direction D2 in the first sintered electrode layer 31 covering one end face 2a. The dimension Lg is a distance between one end face 2a and the end portions 9d of the plurality of second internal electrodes 9 on the one end face 2a side in the facing direction D2. During the being electrically conducted, the first internal electrode 7 becomes an internal electrode having the same polarity as the first external electrode 3, and the second internal electrode 9 becomes an internal conductor having a different polarity from that of the first external electrode 3. Therefore, the dimension Lg is a separation distance between the first external electrode 3 and the internal electrode having a different polarity in the facing direction D2. The dimension T is a distance between the pair of main faces 2c and 2c in the stacking direction D1. The dimension Tg1 is a distance between the mounting face 21 and the second internal electrode 9 closest to the mounting face 21. That is, the dimension Tg1 is a distance between the first external electrode 3 and the mounting face 21 of the outermost internal electrode having a different polarity. The dimension Tg2 is a distance between the mounting face 21 and the first internal electrode 7 closest to the mounting face 21. That is, the dimension Tg2 is a distance between the first external electrode 3 and the mounting face 21 of the outermost internal electrode having the same polarity. The dimension L is a length of the element body 2 in the facing direction D2 (refer to FIG. 2).

The virtual line segment C is a line segment connecting the end portion 31d of the wraparound portion 31c of the first sintered electrode layer 31 in the facing direction D2 and the midpoint Tc of one end face 2a in the stacking direction D1. An intersection point P1 is an intersection point of a virtual straight line in which the second internal electrode 9 closest to the mounting face 21 is extended in the facing direction D2 and the virtual line segment C. An intersection point L1 is an intersection point of a virtual perpendicular line extending from the intersection point P1 toward the mounting face 21 and the mounting face 21. A length of the perpendicular line extending from the intersection point P1 to the intersection point L1 is equal to the dimension Tg1. An intersection point P2 is an intersection point of a virtual straight line in which the first internal electrode 7 closest to the mounting face 21 is extended in the facing direction D2 and the virtual line segment C. An intersection point L2 is an intersection point of a virtual perpendicular line extending from the intersection point P2 toward the mounting face 21 and the mounting face 21. A length of the perpendicular line extending from the intersection point P2 to the intersection point L2 is equal to the dimension Tg2.

In this embodiment, the dimension Lg is smaller than the dimension b. That is, the end portion 9d of the second internal electrode 9 is located outside the end portion 31d of the wraparound portion 31c in the facing direction D2. In addition, the dimension Lg satisfies the relational expression of Lg<0.14×L. The dimension Lg may be 90 µm to 440 µm, preferably 90 μm to 250 μm, more preferably 90 μm to 190 μm. The dimension Tg1 may be 60 μm to 160 μm, preferably 90 μm to 150 μm. The dimension b may be 160 μm to 320 μm, preferably 180 μm to 240 μm.

As illustrated in FIG. 8, the triangle having the end portion 31d, the midpoint Tc, and the corner 31r as vertices is similar to the triangle having the end portion 31d, the intersection point P1, and the intersection point L1 as vertices. Therefore, when the distance between one end face 2a and the intersection point P1 is represented by X, the relational expression of the following formula (1) is satisfied from the ratio of the lengths of the sides. Accordingly, the relational expression of the formula (2) is satisfied. In the penetrating capacitor 1 according to the present disclosure, the dimension Lg is larger than X. That is, the relational expression of the formula (3) is satisfied.

$$T/2:Tg1=b:(b-X) \tag{1}$$

$$X=b-(2 \times b \times Tg1/T) \tag{2}$$

$$Lg>b-(2 \times b \times Tg1/T) \tag{3}$$

In the example illustrated in FIG. 8, the first internal electrode 7 closest to the mounting face 21 is closer to the mounting face 21 than the second internal electrode 9 closest to the mounting face 21. In such a state, the relational expression of the following formula (4) is satisfied. A triangle having an end portion 31d, a midpoint Tc, and a corner 31r as vertices is similar to a triangle having an end portion 31d, an intersection point P2, and an intersection point L2 as vertices. Therefore, when the distance between one end face 2a and the intersection point P2 is represented by Y, the relational expression of the formula (5) is satisfied from the ratio of the lengths of the sides. Accordingly, the relational expression of the formula (6) is satisfied. In the penetrating capacitor 1 according to the present disclosure, the dimension Lg is larger than Y. That is, the relational expression of the formula (7) is satisfied.

$$Tg1>Tg2 \tag{4}$$

$$T/2:Tg2=b:(b-Y) \tag{5}$$

$$Y=b-(2 \times b \times Tg2/T) \tag{6}$$

$$Lg>b-(2 \times b \times Tg2/T) \tag{7}$$

In the example of FIG. 8, a mode in which one main face 2c is set to the mounting face 21 has been described. In addition, in the example of FIG. 8, the dimensional relationship between one end face 2a side and one main face 2c side has been described. In the present embodiment, the relational expression described above is also satisfied for the other end face 2a side facing one end face 2a and one main face 2c side. In addition, when the other main face 2c facing the one main face 2c is set to the mounting face 21, the penetrating capacitor 1 also satisfies the relational expression of the formula (3) on the one end face 2a side and the other main face 2c side. In addition, the penetrating capacitor 1 also satisfies the relational expression of the formula (3) on the other end face 2a side and the other main face 2c side. In addition, Tg1<Tg2 on the other main face 2c side, but in this case, when the relational expression of the formula (3) is satisfied, the relational expression of the formula (7) is naturally satisfied.

When the three-terminal-type penetrating capacitor 1 as described above is mounted on the electronic device 20, the first external electrode 3 and the second external electrode 5 are soldered to the electronic device 20 as an example. At this time, in the penetrating capacitor in the related art, cracks may occur in the element body due to the bending of the peripheral structure of each external electrode due to thermal expansion or the like. There is a problem that the internal electrodes can be short-circuited due to such cracks.

Herein, as a result of diligent research, the present inventors have found a high correlation between the position of cracks occurring in the element body 2 due to thermal expansion and the like and the dimensions of each configuration of the penetrating capacitor 1. More specifically, as viewed from the direction (width direction D3) in which the pair of side faces 2b and 2b face each other, in the first sintered electrode layer 31 covering one end face 2a, a virtual line segment C connecting the end portion 31d in the facing direction D2 of the wraparound portion 31c wrapping around from one end face 2a to one main face 2c and the midpoint Tc of one end face 2a in the stacking direction D1 is set. The present inventors have found that cracks are likely to occur in a region (referred to as a crack occurring region CR) between the virtual line segment C and the corner 31r of the first sintered electrode layer 31.

On the other hand, the penetrating capacitor 1 according to the present disclosure satisfies the relational expression of the formula (3). In this case, on the one end face 2a side, the end portion 9d of the second internal electrode 9 having a polarity different from that of the first external electrode 3 is located on the outside the crack occurring region CR even when the end portion 9d is closest to the mounting face 21. For this reason, it is possible to prevent cracks from reaching any of the second internal electrodes 9 having a polarity different from that of the first external electrode 3. Accordingly, even when cracks occur in the element body 2, it is possible to prevent the cracks from occurring in the region where the plurality of first internal electrodes 7 and the plurality of second internal electrodes 9 are stacked. From the above reason, the short-circuit can be suppressed.

In addition, in the present embodiment, on one main face 2c (mounting face 21) side, the relational expression of the formula (4) is satisfied. At this time, even when the relational expression of the formula (3) is satisfied, there is a possibility that the portion (capacitive portion) of the first internal electrode 7 corresponding to the second internal electrode 9 enters the inside of the crack occurring region CR. Each of the first internal electrodes 7 has the same polarity as each other. However, even when the internal electrodes have the same electrode, cracks may occur in the capacitance portion, so that a problem may occur in the penetrating capacitor 1. Therefore, when the relational expression of the formula (4) is satisfied on the mounting face 21 side, it is preferable that the relational expression of the formula (7) is satisfied.

When the distance between one main face 2c and the first internal electrode 7 closest to the one main face 2c is set to the dimension Tg2, the relational expressions of the formulas (4) and (7) are satisfied. In this case, the first internal electrode 7 is closer to one main face 2c than the second internal electrode 9. At this time, in the plurality of first internal electrodes 7, the portion corresponding to the end portion 9d of the plurality of second internal electrodes 9 on one end face 2a side is located outside the crack occurring region CR. Accordingly, even when cracks occur in the element body 2, it is possible to more reliably suppress the occurrence of the cracks in the region where the plurality of first internal electrodes 7 and the plurality of second internal electrodes 9 are stacked. From the above reason, the short-circuit can be suppressed.

The dimension Lg is smaller than the dimension b. In addition, when the length of the element body 2 in the facing direction D2 is set to the dimension L, the relational expression of Lg<0.14×L is satisfied. In this case, it is possible to secure the area of the region where the plurality of first internal electrodes 7 and the plurality of second internal electrodes 9 are stacked. Therefore, the capacitance can be secured.

The dimension Tg1 may be 90 μm to 150 μm. In addition, the length of the penetrating capacitor 1 in the longer direction (facing direction D2) may be 1.6 mm or more, and the length in the shorter direction (width direction D3) may be 0.8 mm or more. In this case, it is possible to secure the stacking height of the plurality of first internal electrodes 7 and the plurality of second internal electrodes 9. In addition, the size of the penetrating capacitor 1 in the longer direction and the shorter direction can be secured. Therefore, the capacitance can be secured. In addition, in penetrating capacitor 1 having such a large chip size, the effect of suppressing the short-circuit can be obtained more remarkably.

The dimension b may be 180 μm to 240 μm. In this case, the region where the cracks occur in the element body 2 can be maintained small. Therefore, the short-circuit can be suppressed.

Subsequently, the evaluation test results of the above-mentioned penetrating capacitor will be described with reference to FIGS. 9 and 10.

Figure 9:
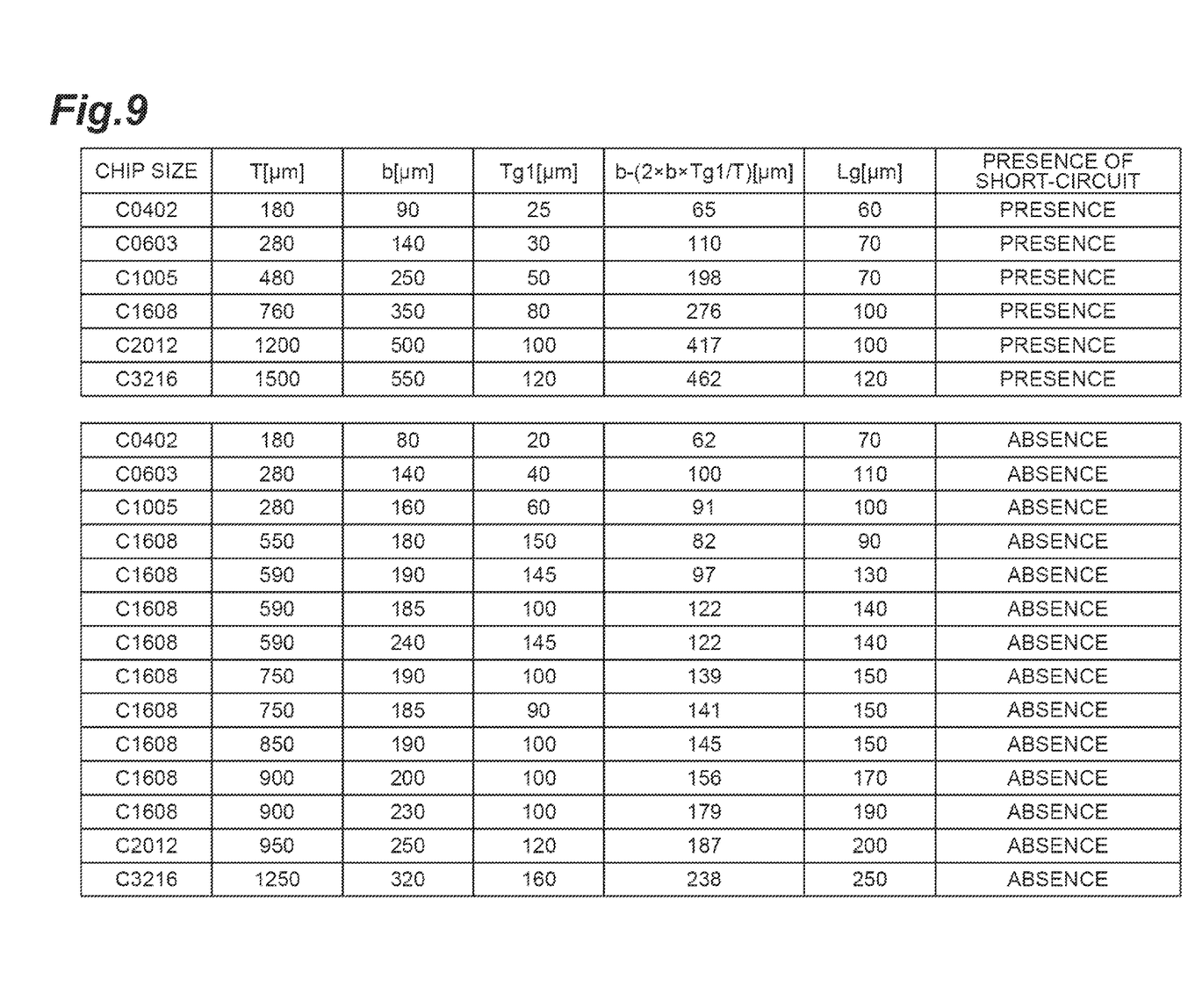
FIG. 9 is a diagram illustrating an evaluation test result of the penetrating capacitor.
Figure 10:
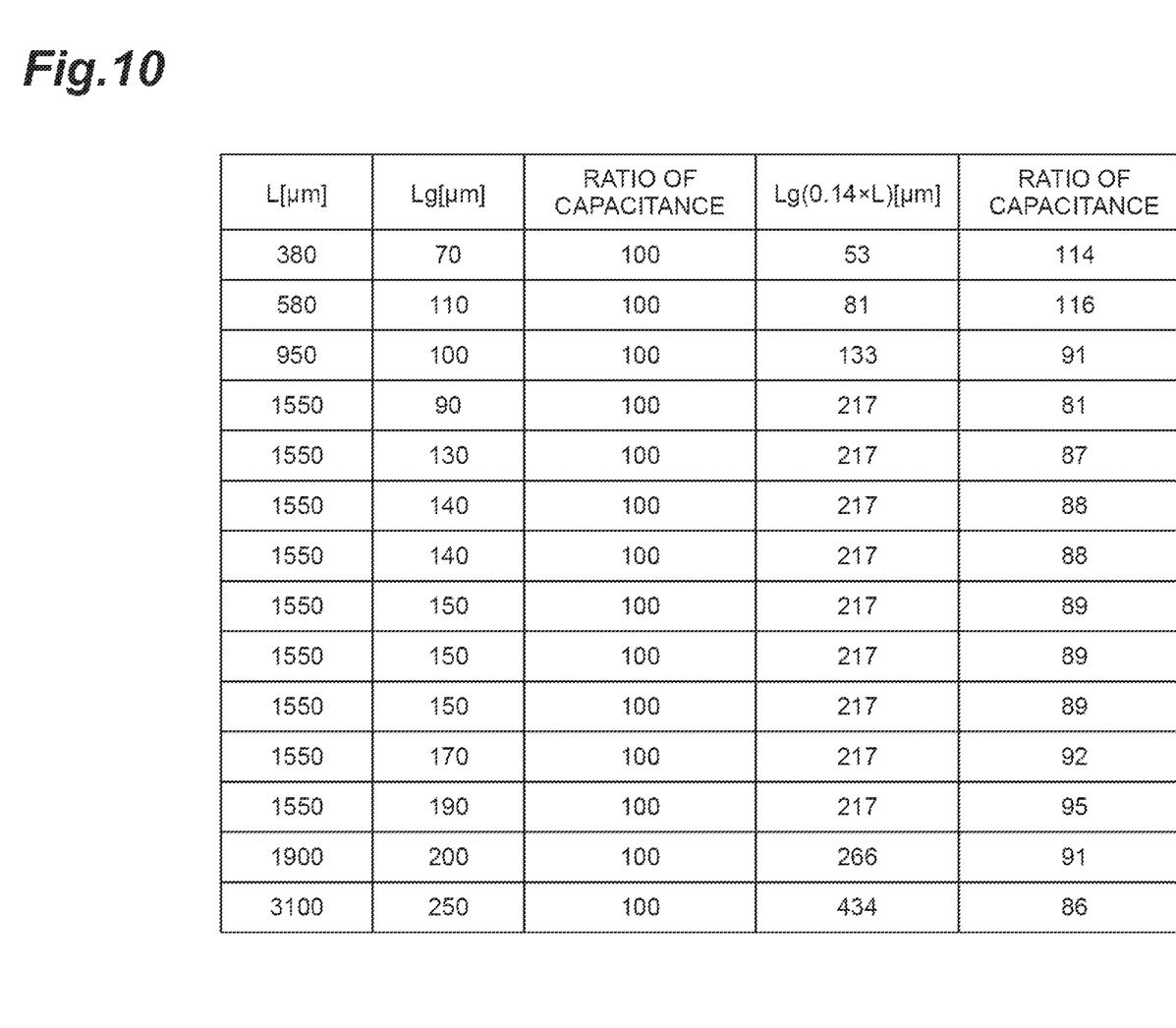
FIG. 10 is a diagram illustrating the evaluation test result of the penetrating capacitor.

FIGS. 9 and 10 are diagrams illustrating the evaluation test results of the penetrating capacitor. In the evaluation test illustrated in FIG. 9, a plurality of penetrating capacitors having different chip sizes, dimensions T [μm], dimensions b [μm], dimensions Tg1 [μm], and dimensions Lg [μm] were prepared. In this evaluation test, each penetrating capacitor was mounted on the electronic device, and it was checked whether or not short-circuit occurred between the internal electrodes due to cracks occurring in the element body due to thermal expansion or the like. In FIG. 9, the chip size is described in JIS notation.

As illustrated in FIG. 9, in the penetrating capacitor not satisfying the relational expression of the formula (3), the short-circuit occurred between the internal electrodes due to the cracks occurring in the element body (refer to the upper diagram of FIG. 9). On the other hand, in the penetrating capacitor satisfying the relational expression of the formula (3), the short-circuit did not occur between the internal electrodes due to the cracks occurring in the element body (refer to the lower diagram of FIG. 9). Therefore, by configuring the penetrating capacitor so as to satisfy the relational expression of the formula (3), it was confirmed that the short-circuit between the internal electrodes can be suppressed.

In addition, as illustrated in FIG. 9, according to a penetrating capacitor having a dimension Lg smaller than the dimension b, a penetrating capacitor having a dimension Tg1 of 90 μm to 150 μm, a penetrating capacitor having a dimension b of 180 μm to 240 μm, and a penetrating capacitor having a length of 1.6 mm or more in the longer direction and a length of 0.8 mm or more in the shorter direction (that is, a chip size of C1608), the short-circuit did not occur between internal electrodes due to the cracks occurring in the element body. From the results of this evaluation test, it was confirmed that the penetrating capacitor satisfying these relational expressions can more preferably suppress the short-circuit between the internal electrodes.

In the evaluation test illustrated in FIG. 10, a plurality of penetrating capacitors having different dimensions L [μm] and Lg [μm] were prepared. In this evaluation test, each penetrating capacitor was mounted on the electronic device, and the capacitance of the penetrating capacitor was measured. In the left table in FIG. 10, each numerical value relating to the penetrating capacitor (penetrating capacitor illustrated in the lower diagram of FIG. 9) in which the short-circuit did not occur in FIG. 9 is described. That is, in the left table in FIG. 10, the dimension L, the dimension Lg, and the ratio of the capacitance of each penetrating capacitor are illustrated. The ratio of the capacitance of each penetrating capacitor was set to 100. In addition, in the right table in FIG. 10, each numerical value relating to the penetrating capacitor configured so that the dimension Lg of the penetrating capacitor illustrated in the left table is 0.14×L [μm] is described. That is, in the table on the right in FIG. 10, the dimension Lg and the ratio of the capacitance of each penetrating capacitor are described. The ratio of the capacitance of each penetrating capacitor illustrates the ratio of the capacitance when the capacitance of the penetrating capacitor illustrated in the left table is set to 100.

As described above, the dimension Lg is a distance between one end face 2a and the end portions 9d of the plurality of second internal electrodes 9 on the one end face 2a side in the facing direction D2. As the dimension Lg becomes larger, the end portion 9d of the second internal electrode 9 is more separated from the crack occurring region CR, so that the short-circuit is less likely to occur. On the other hand, as the dimension Lg becomes larger, the area of the region where the plurality of first internal electrodes 7 and the plurality of second internal electrodes 9 are stacked on each other becomes smaller. Therefore, as the dimension Lg becomes larger, the short-circuit can be more reliably suppressed, but the capacitance of the penetrating capacitor 1 becomes smaller.

Herein, the dimension Lg of the penetrating capacitor illustrated in the left table of FIG. 10 is set as a suitable size for each chip size to appropriately obtain the short-circuit suppressing effect and to sufficiently obtain the capacitance. When the dimension Lg was set to be larger than the dimension, the ratio of the capacitance become lower than 100%, but if the ratio of the capacitance can be suppressed to 80% or more, the capacitance can be sufficiently secured. As illustrated in FIG. 10, even when the dimension Lg was set to 0.14×L [μm], the capacitance of the penetrating capacitor was 81% of the capacitance of the penetrating capacitor in the table on the left for any chip size. Therefore, it was confirmed that a sufficient capacitance can be secured when the penetrating capacitor satisfied the relational expression of Lg<0.14×L.

The present disclosure is not limited to the embodiments described above.

In the above-described embodiment, the penetrating capacitor 1 in which one main face 2c is the mounting face 21 is illustrated, but the other main face 2c may be the mounting face 21.

In the above-described embodiment, the relational expression of the formula (3) is satisfied on both sides of the pair of end faces 2a and 2a on the one main face 2c side. In addition, the relational expression of the formula (3) is satisfied on both sides of the pair of end faces 2a and 2a on the other main face 2c side. However, the relational expression of the formula (3) may be satisfied only on one end face 2a side of any one of the pair of main faces 2c and 2c on the main face 2c side which is the mounting face 21.

In addition, the relationship between the dimensions is not limited to that described above. Each of the dimensions (dimension b, dimension Lg, dimension L, dimension T, dimension Tg1, and dimension Tg2) can be appropriately changed as long as the effects of the present disclosure are obtained.

In addition, the connection mode of the first internal electrode 7 and the second internal electrode 9 is not limited to that described above. The first internal electrode 7 may be exposed to at least one end face 2a, and the second internal electrode 9 may be separated from at least one end face 2a.

In addition, the configuration of the first external electrode 3 is not limited to that described above. For example, the first external electrode 3 may not have the second sintered electrode layer 32.

1: penetrating capacitor (multilayer capacitor), 2: element body, 2a: end face, 2b: side face, 2c: main face, 3: first external electrode, 5: second external electrode, 7: first internal electrode, 9: second internal electrode, 9d: end portion, 31: first sintered electrode layer (sintered electrode layer), 31c: wraparound portion, b, L, Lg, T, Tg1, Tg2: dimension, D1: stacking direction, D2: facing direction (longer direction), D3: width direction (shorter direction).

What is claimed is:

1. A multilayer capacitor comprising:
    an element body having a pair of end faces facing each other and a pair of side faces and a pair of main faces located between the pair of end faces and extending in a facing direction of the pair of end faces;
    a pair of first external electrodes disposed on the pair of end faces;
    a second external electrode separated from the pair of first external electrodes and disposed on at least one of the pair of side faces;
    a plurality of first internal electrodes disposed in the element body and exposed from at least one of the end faces; and
    a plurality of second internal electrodes disposed in the element body and separated from one of the end faces,
    wherein the pair of first external electrodes covers the pair of end faces and includes a sintered electrode layer connected to the plurality of first internal electrodes,
    wherein each of the plurality of first internal electrodes and each of the plurality of second internal electrodes are stacked with each other with a direction of the pair of main faces facing each other as a stacking direction,
    wherein the plurality of first internal electrodes and the plurality of second internal electrodes include a first adjacent internal electrode adjacent to one main surface of the pair of main surfaces and a second adjacent internal electrode adjacent to the other main surface of the pair of main surfaces,
    first internal electrodes of the plurality of first internal electrodes and second internal electrodes of the plurality of second internal electrodes are alternately disposed from the first adjacent internal electrode to the second adjacent internal electrode, each first internal electrode being adjacent to a corresponding second internal electrode, each second internal electrode being adjacent to a corresponding first internal electrode, and
    wherein, when, in the sintered electrode layer covering the one end face, a wraparound dimension of a wraparound portion wrapping around from the one end face to the one main face in the facing direction is set to a dimension b,
    a distance between the one end face and the end portions of the plurality of second internal electrodes on the one end face side in the facing direction is set to a dimension Lg,
    a distance between the pair of main faces in the stacking direction is set to a dimension T, and
    a distance between the one main face and the second internal electrode closest to the one main face is set to a dimension Tg1,
    a relational expression of $Lg>b-(2\times b\times Tg1/T)$ is satisfied.

2. The multilayer capacitor according to claim 1, wherein, when a distance between the one main face and the first internal electrode closest to the one main face is set to a dimension Tg2,
    a relational expression of $Tg1>Tg2$ and $Lg>b-(2\times b\times Tg2/T)$ is satisfied.

3. The multilayer capacitor according to claim 1, wherein the dimension Lg is smaller than the dimension b.

4. The multilayer capacitor according to claim 1, wherein, when a length of the element body in the facing direction is set to a dimension L, a relational expression of $Lg<0.14\times L$ is satisfied.

5. The multilayer capacitor according to claim 1, wherein the dimension Tg1 is 90 μm to 150 μm.

6. The multilayer capacitor according to claim 1, wherein the dimension b is 180 μm to 240 μm.

7. The multilayer capacitor according to claim 1, wherein a length in a longer direction is 1.6 mm or more, and a length in a shorter direction is 0.8 mm or more.

8. The multilayer capacitor according to claim 1, wherein the sintered electrode layer includes a first sintered layer connected to the plurality of first internal electrodes and a second sintered layer disposed on the first sintered layer and separated from the plurality of first internal electrodes by the first sintered layer, a portion of the first sintered layer being sandwiched between the second sintered layer and the plurality of first internal electrodes in the facing direction of the pair of end faces.

* * * * *